(12) United States Patent
Simpson et al.

(10) Patent No.: US 8,574,470 B2
(45) Date of Patent: Nov. 5, 2013

(54) COMBUSTION SYNTHESIS TO BOND METAL INSERTS TO C-C COMPOSITE SURFACES

(75) Inventors: Allen H. Simpson, Buchanan, MI (US); Mark L. La Forest, Granger, IN (US); Alexander Mukasyan, Granger, IN (US)

(73) Assignees: Honeywell International Inc., Morristown, NJ (US); The University of Notre Dame du Lac, Notre Dame, IN (US)

( * ) Notice: Subject to any disclaimer, the term of this patent is extended or adjusted under 35 U.S.C. 154(b) by 886 days.

(21) Appl. No.: 12/258,030

(22) Filed: Oct. 24, 2008

(65) Prior Publication Data

US 2010/0104465 A1    Apr. 29, 2010

(51) Int. Cl.
*C01B 31/00* (2006.01)
(52) U.S. Cl.
USPC ........................................................ 264/29.5
(58) Field of Classification Search
USPC ...................................... 264/29.5; 156/273.7
See application file for complete search history.

(56) References Cited

U.S. PATENT DOCUMENTS

| 2005/0221051 A1* | 10/2005 | Simpson et al. | 428/66.2 |
| 2005/0264090 A1* | 12/2005 | Kaczynski et al. | 301/6.1 |
| 2007/0235126 A1* | 10/2007 | Simpson et al. | 156/273.7 |
| 2010/0104465 A1* | 4/2010 | Simpson et al. | 419/8 |

FOREIGN PATENT DOCUMENTS

EP          1826447 A1    8/2007
WO    WO-2007/115022 A1  10/2007

OTHER PUBLICATIONS

White et al., "Novel Apparatus for Joining of Carbon-Carbon Composites", Review of Scientific Instruments, vol. 78, Jan. 11, 2007, pp. 15105-1 to 15101-5.

* cited by examiner

*Primary Examiner* — Larry Thrower
(74) *Attorney, Agent, or Firm* — Shumaker & Sieffert, P.A.

(57) ABSTRACT

Method of joining a carbon-carbon composite piece 30 together with a metal insert 20, e.g. in the manufacture of aircraft brake discs 10. The method includes the steps of: providing a carbon-carbon composite piece 30 and a metal insert 20, wherein the metal insert 20 has a surface that is complementary to a surface of said carbon-carbon composite piece 30; providing a layer of a mixture of titanium powder and carbon powder on the first complementary mating surface; arranging the powder layer such that a second complementary mating surface is matched to the complementary mating surface, thereby forming a construct of the carbon-carbon composite piece 30, the powder layer, and the metal insert 20; placing the construct into a press and applying pressure to the construct to press together the carbon-carbon composite piece and the metal insert joined at their complementary surfaces; and applying an electrical current to the powder in the construct to initiate a metal-carbon reaction, thereby bonding the carbon-carbon composite piece 30 together the metal insert 20. The titanium powder particles may be from 25 to 100 microns in diameter, and the carbon powder (e.g., graphite particles) may be 0.1 to 1 microns in diameter.

19 Claims, 2 Drawing Sheets

110 providing a layer of a mixture of titanium powder and carbon powder on a first complementary mating surface of the carbon-carbon composite piece or the metal insert

120 arranging the second complementary mating surface of the metal insert or the carbon-carbon composite piece to match the first complementary mating surface to form a construct and applying pressure to the construct

130 applying an electrical current to the powder in the construct to bond the carbon-carbon composite piece and the metal insert

Figure 2

COMBUSTION SYNTHESIS TO BOND METAL INSERTS TO C-C COMPOSITE SURFACES

FIELD OF THE INVENTION

This invention relates to carbon-carbon composite material and metal, and in particular to bonding a carbon-carbon composite piece with metal inserts without using rivets. The method of the present invention is especially suitable for the manufacture of carbon-carbon aircraft brake discs to bond metal inserts to rotors in aircraft landing systems. Brake discs manufactured in accordance with the method of this invention are likewise contemplated herein.

BACKGROUND OF THE INVENTION

The use of carbon-carbon composite brake disc assemblies in aircraft brakes, which have been referred to as carbon brakes, is well known in the aerospace industry. Carbon-carbon composite brake disc assemblies are manufactured by aircraft wheel and brake manufacturers using a variety of manufacturing methods, which generally require lengthy fabrication and densification methods. In recent years, aircraft manufacturers have increasingly specified the use of such carbon-carbon composite brake disc assemblies for brakes designed for use with new aircraft models.

Typically, a carbon-carbon composite brake disc of a brake disc assembly has either a plurality of circumferentially spaced-apart slots about the circumference of a central opening, which receive splines of an adjacent torque tube, or a plurality of circumferentially spaced-apart slots about the circumference of the outer diameter of the brake disc, which receive drive keys of an adjacent aircraft wheel. The splines of the torque tube and the drive keys of the wheel are usually made of metal. As is well known in the aircraft wheel and brake industry, the spaced-apart slots of the brake disc may each include a metal insert to provide a metal-to-metal interface between the brake disc and either the spline of the torque tube or the drive key of the wheel. The metal-to-metal interface reduces the wear of the spaced-apart slots in the carbon-carbon composite brake disc, and also reduces chipping of the slots, which can occur as a result of loads exerted on the surfaces of the slots.

However, the use of metal inserts may require that holes be drilled into the carbon-carbon composite brake disc so the metal inserts can be riveted to the disc, which increases machining and assembly time, and results in an increase the cost of manufacturing the brake disc. Additionally, the rivets are expensive to purchase and to install as well as add additional weight to the brake disc. Each rivet requires a hole to be drilled to accommodate it in the carbon-carbon composite piece and in the metal insert itself, which is also labor intensive. In addition, the rivets often break allowing the metal insert to be disconnected from the carbon-carbon composite piece.

SUMMARY OF THE INVENTION

In contrast, a reactive mixture of fine metal and carbon powders is placed in between the carbon-carbon composite piece and the metal insert. Pressure is applied to the exterior of the carbon-carbon composite piece and metal insert compressing the two pieces together with the reactive metal and carbon mixture in between the two pieces. As the pressure is applied, an electric current passes between the carbon-carbon composite piece and the metal insert heating and igniting the powder mixture. The resulting high temperature combustion reaction creates molten metal carbide ceramic. The molten ceramic quickly freezes, bonding the carbon-carbon composite piece and the metal insert. The result is a lighter and stronger brake disc that can be manufactured cheaper, faster and with less labor.

One embodiment of this invention is a method of joining carbon-carbon composite piece together with a metal insert. The method includes the steps of: providing a carbon-carbon composite piece and a metal insert, wherein the carbon-carbon composite has at least one radially extending opening within the circumference of the outer diameter of the carbon-carbon composite piece, each opening has a surface that is complementary to a surface of the metal insert; providing a layer of a mixture of titanium powder and carbon powder on the first complementary mating surface; arranging the metal insert on the powder layer such that the complementary mating surface of the metal insert is matched to the complementary mating surface of the carbon-carbon composite piece, thereby forming a construct of the carbon-carbon composite piece, the powder layer, and the metal insert; placing the construct into a press and applying pressure to the construct to press together the two pieces joined at their complementary surfaces; and applying an electrical current to the powder mixture in the construct to initiate a gasless metal-carbon reaction, thereby bonding the carbon-carbon composite piece together with the metal insert.

Another embodiment of the present invention is a carbon-carbon composite aircraft brake disc with metal inserts, produced by the method described herein. The carbon-carbon composite brake disc with metal insert is made of a carbon-carbon composite piece and metal insert joined together by a carbide layer, e.g. a layer 100 microns thick, formed from titanium and carbon powders.

BRIEF DESCRIPTION OF THE DRAWING

The present invention will be more fully understood by reference to the detailed description given hereinbelow and to the accompanying drawing. The drawings are not to scale, and is provided by way of illustration only. The drawings do not in any way limit the present invention.

FIG. 2 is a flow chart illustrating a method of joining a carbon-carbon composite piece together with a metal insert in accordance with an embodiment of the present invention.

DETAILED DESCRIPTION OF THE INVENTION

Figure 1:
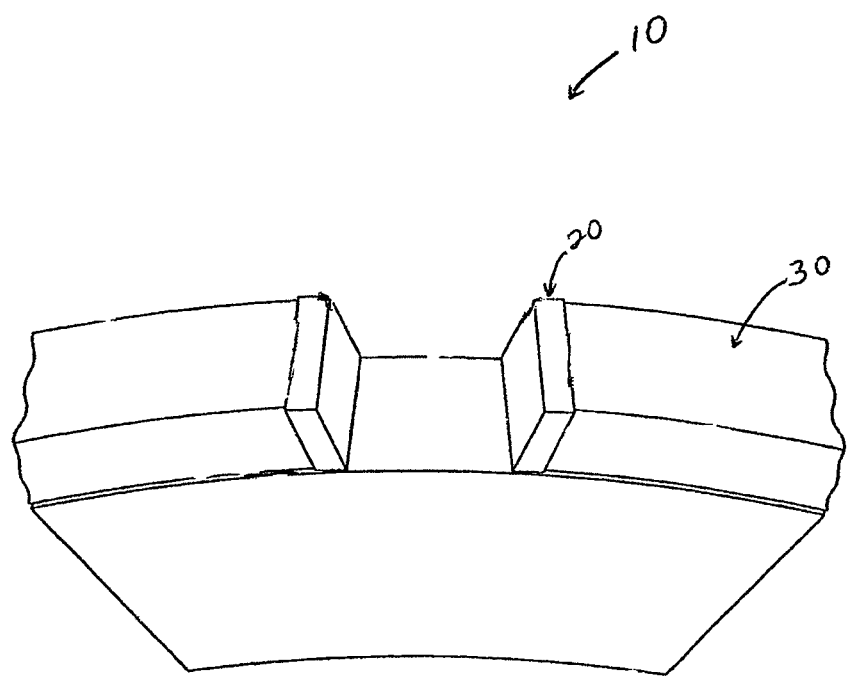
FIG. 1 is a perspective view of a portion of an aircraft brake rotor with metal insert manufactured in accordance with an embodiment of the present invention.

An embodiment of the present invention employs liquid titanium carbide as a hot "glue." The melting point of titanium carbide, which is 3100 K, is significantly higher than the operating temperatures of aircraft brakes, which is about 1600 K. Also, the heat capacity of titanium carbide on a volume basis is comparable to that of carbon-carbon composite or the metal insert, so the bonding material does not degrade the thermal properties of the brakes.

FIG. 1 provides a perspective view of a portion of an aircraft brake rotor 10 with bonded metal insert 20. The brake rotor is in contact with the metal insert 20. The rotor includes an opening to accommodate the metal insert. A thin layer of titanium and carbon powder mixture (not shown) is placed on a complementary surface of the carbon-carbon composite piece 30 or the metal insert 20 so that the complementary surfaces are in contact with each other. After processing in accordance with the present invention, an aircraft brake rotor 10 has a metal insert 20 bonded to a face of the radially extending opening.

The carbon-carbon composite piece is a disc that is generally annular in shape with a central opening. A pair of generally parallel surfaces define the disc thickness and the pair of generally parallel surfaces extend radially between an outer axial surface and an inner axial surface. The inner axial surface surrounds the central opening. The outer axial surface includes at least one radially extending opening in its outer diameter. The radially extending opening includes a pair of oppositely disposed faces extending radially to a surface located at either end of the radially extending opening. Each face has an axial width less than the disc thickness in the radial direction. The opening includes an outer axial surface at a diameter less than the outer diameter of the composite material. The carbon-carbon composite piece includes surfaces to hold powder, such as the top side of the opening in the outer axial surface, to mate with the complementary surface of the metal insert. As long as a sufficient amount of the mating surface is covered by powder, the bond between the metal insert and the carbon-carbon composite piece should be strong enough to withstand normal use. The percent of the mating surface covered by powder ranges from 100% to 25%. If less than 25% of the mating surface is covered by powder, the bond formed between the metal insert and the carbon-carbon composite piece may not be strong enough to withstand normal use.

The metal insert covers a portion of the outer axial surface on the outer circumference of the carbon-carbon composite piece, covers both faces of the radially extending opening, covers the outer axial surface of the radially extending opening and a portion of either parallel surface that defines the disc thickness. The metal insert may only cover one face of the radially extending opening. The metal insert includes surfaces to hold powder, such as the bottom side of the metal insert, to mate with the complementary surface of the carbon-carbon composite piece. As shown in FIG. 1, metal insert 20 may be smaller than the carbon-carbon composite piece 30.

In accordance with an embodiment of the invention, a carbon-carbon composite piece to be joined together with the metal insert is selected, machined and includes at least one radially extending opening in the outer diameter of the outer axial surface. That is to say, at least one opening to accommodate a metal insert to cover a face of the opening is present on the composite piece.

A mixture of titanium powder and carbon powder is placed on at least one of the mating surfaces of the carbon-carbon composite piece or the metal insert. Typically, the metal powder matches the metal of the metal insert, for example, if the metal insert was made of titanium, a titanium power is used. However, the metal powder and the metal of the metal insert may differ. Metals, such as tungsten (W), tantalum (Ta) and molybdenum (Mo), can be used for the metal insert. Metals such as titanium, zirconium (Zr), vanadium (V) and hafnium (Hf) may be used for the metal powders; however, the method will be described using titanium for both the metal powder and the metal insert. The particle size of the titanium and carbon powders should be small, in order to create a large powder surface area that will support a rapid combustion reaction. Generally, the average diameter of the titanium powder particles will range from 25 to 100 microns, and the carbon powder will come from powdered graphite in which the average diameter of the graphite particles will range from 0.1 to 1 microns. Typical specific examples would be titanium powder particles having an average diameter of about 45 microns, and graphite particles having an average diameter of about 0.5 microns. Such powders can be prepared as needed, but they are commercially available from a variety of sources, including Alfa Aesar (a Johnson Matthey Company) of Ward Hill, Mass. The titanium (Ti) and carbon (C) powders will generally be mixed in molar ratio of titanium powder to powdered graphite ranging from 3:1 to 1:1. We have found that a molar ratio of Ti to C of about 2:1 works well. The thickness of the Ti/C mixture layer ranges from 200 microns to 1 mm. When the thickness of the Ti/C mixture layer is less than 200 microns, the subsequent bond between the metal insert and the carbon-carbon composite piece may not be strong enough to withstand normal use. When the thickness of the Ti/C mixture layer is greater than 1 mm, some of the mixture may escape from the sides between the metal insert and the carbon-carbon composite piece during the bonding process.

To effect bonding, the other complementary mating surface is placed onto the complementary mating surface to which the powder mixture has been applied, and the two pieces joined at their complementary surfaces with a layer of titanium and carbon powder between them are pressed tightly. A typical pressure would be on the order of 7400 pounds per square inch, applied for 10 seconds. While the construct is under pressure, an electrical current is applied to the construct in order to begin a combustion reaction. A typical electric current would be 600 Amps applied for 5 seconds. The metal-carbon reaction, once started, is highly exothermic, and has an adiabatic combustion temperature of over 3300 K. The product of the reaction is titanium carbide (TiC) at a temperature so high that the TiC is in liquid form.

The powder mixture may be placed in the complementary surface by any convenient method. For instance, when an aircraft brake disk is being manufactured, the bottom piece will lie with the surface in a vertical plane and the mixed powder can be shaken out onto the top surface from a "salt shaker" type dispenser. Pressure on the carbon-carbon composite piece and the metal insert force small amounts of the liquefied TiC into the pores of the composite piece and the metal insert. The operator will normally distribute the powder mixture as evenly as possible. However, a precisely uniform layer of powder is not essential, because during the bonding procedure, the liquefied powder is distributed evenly across the plane and partially forced into pores of the composite piece and the metal insert being bonded together. The heat of the reaction is rapidly absorbed by the carbon-carbon composite piece and metal insert, lowering the temperature of the reaction product. As the liquid reaction product material cools below about 1933 K, the liquid "freezes", bonding the carbon-carbon composite piece together with the metal insert.

A method of joining a carbon-carbon composite piece together with a metal insert in accordance with an embodiment of the present invention is illustrated in FIG. 2. This method includes providing a layer of a mixture of titanium powder and carbon powder on a first complementary mating surface of the carbon-carbon composite piece or metal insert at step 100, arranging the second complementary mating surface of the metal insert or the carbon-carbon composite piece of the first complementary mating surface to form a construct at step 110, applying pressure to the construct at step 120 and applying an electrical current to the powder in the construct to bond the carbon-carbon composite piece and the metal insert at step 130.

EXAMPLE

Employing an apparatus, a controller is programmed with an initial loading force of 500 lbs/in$^2$, a maximum loading force of 7400 lbs/in$^2$, a delay time of maximum force application of 1 second, a time of maximum force application of 10 seconds, a maximum current of 600 Amps, a time of current of 5 seconds, and an initial temperature of 300 K. Next, an area of the complementary surface of the carbon-carbon composite piece or the metal insert is covered with a layer of Ti/graphite mixture and a corresponding complementary surface of the metal insert or carbon-carbon composite piece is placed on the powdered surface, to form a "sandwich" construct with a "filling" of titanium/graphite powder. The resulting construct is placed in the apparatus and the Ti/graphite mixture is ignited, bonding the carbon-carbon composite piece with the metal insert.

While the present invention has been described with respect to a detailed example of its implementation, the invention is capable of numerous modifications, rearrangements, and alterations, and such are intended to be within the spirit and scope of the disclosure and claims.

What is claimed is:

1. A method comprising:
   depositing a layer comprising titanium powder and carbon powder on at least one of a first complementary mating surface and a second complementary mating surface that is complementary to the first complementary mating surface, wherein a carbon-carbon composite piece defines the first complementary mating surface and a metal insert defines the second complementary mating surface, wherein the carbon-carbon composite piece has an annular disk shape comprising an outer axial surface defining at least one radially extending opening, the at least one radially extending opening defining at least a portion of the first complementary mating surface;
   arranging the first and second complementary mating surfaces such that the powder layer is between the second complementary mating surface of the metal insert and the first complementary mating surface of the carbon-carbon composite at the at least one radially extending opening to form a construct of the carbon-carbon composite piece, the powder layer, and the metal insert;
   applying pressure to the construct to press together the carbon-carbon composite piece and the metal insert joined at their complementary mating surfaces; and
   applying an electrical current to the powder layer in the construct to initiate an oxidation reduction reaction to bond the carbon-carbon composite piece and the metal insert together.

2. The method of claim 1, wherein applying pressure to the construct comprises applying pressure to the construct via a press, the method further comprising removing the carbon-carbon composite piece and the metal insert, wherein the carbon-carbon composite piece and the metal insert are bonded to each other, from the press within 30 minutes of placing the unbonded carbon-carbon composite piece and metal insert into the press.

3. The method of claim 2, wherein removing the carbon-carbon composite piece and the metal insert, wherein the carbon-carbon composite piece and the metal insert are bonded to each other, from the press within 30 minutes of placing the unbonded carbon-carbon composite piece and metal insert into the press comprises removing the carbon-carbon composite piece and the metal insert, wherein the carbon-carbon composite piece and the metal insert are bonded to each other, from the press within 3 minutes of placing the unbonded carbon-carbon composite piece and the metal insert into the press.

4. The method of claim 1, wherein the carbon powder comprises powdered graphite and a mole ratio of titanium powder to powdered graphite ranges from 3:1 to 1:1.

5. The method of claim 4, wherein the mole ratio of titanium powder to powdered graphite is about 2:1.

6. The method of claim 1, wherein an average particle diameter of the titanium powder ranges from 25 to 100 microns.

7. The method of claim 6, wherein the average particle diameter of the titanium powder is about 45 microns.

8. The method of claim 1, wherein the carbon powder comprises powdered graphite and an average particle diameter of the graphite ranges from 0.5 to 1 microns.

9. The method of claim 8, wherein the average particle diameter of the graphite is about 0.5 microns.

10. The method of claim 1, wherein the layer of titanium powder and carbon powder ranges from 200 to 1000 microns in thickness.

11. The method of claim 1, wherein the layer of titanium powder and carbon powder is about 100 microns in thickness.

12. The method of claim 1, wherein applying pressure to the construct comprises applying pressure ranging from 5000 lbs/in$^2$ to 10,000 lbs/in$^2$ to the construct.

13. The method of claim 12, wherein applying pressure to the construct comprises applying pressure of about 7400 lbs/in$^2$ to the construct.

14. The method of claim 1, wherein applying the electrical current to the powder layer in the construct to initiate the oxidation reduction reaction comprises applying the electrical current ranging from 400 to 1200 Amps to the powder layer in the construct to initiate the oxidation-reduction reaction.

15. The method of claim 14, wherein the electrical current is about 600 Amps.

16. The method of claim 1, wherein the metal insert is made of at least one of tungsten, tantalum, and molybdenum.

17. The method of claim 1, wherein the metal powder is different than a metal of the metal insert.

18. The method of claim 1, wherein the metal powder comprises at least one of zirconium, vanadium, and hafnium.

19. A method comprising:
   applying pressure to a composite construct, the composite construct comprising:
      a carbon-carbon composite piece including a first complementary mating surface, wherein the carbon-carbon composite piece has an annular disk shape with an outer axial surface including at least one radially extending opening, the at least one radially extending opening defining at least a portion of the first complementary mating surface,
      a metal insert including a second complementary mating surface, and
      a powder layer separating the first and second complementary mating surfaces at the at least one radially extending opening of the carbon-carbon composite, wherein the powder layer comprises titanium powder and carbon powder; and
   applying an electrical current to the powder layer in the construct to initiate an oxidation reduction reaction to bond the carbon-carbon composite piece and the metal insert together.

* * * * *